United States Patent
Ajima et al.

(10) Patent No.: US 10,826,410 B2
(45) Date of Patent: Nov. 3, 2020

(54) INVERTER DEVICE AND ELECTRIC VEHICLE

(71) Applicant: HITACHI AUTOMOTIVE SYSTEMS, LTD., Ibaraki (JP)

(72) Inventors: Toshiyuki Ajima, Tokyo (JP); Junki Isobe, Hitachinaka (JP); Midori Takaoka, Tokyo (JP); Akihiro Ashida, Hitachinaka (JP); Hiroshi Tamura, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/485,366

(22) PCT Filed: Jan. 18, 2018

(86) PCT No.: PCT/JP2018/001329
§ 371 (c)(1),
(2) Date: Aug. 12, 2019

(87) PCT Pub. No.: WO2018/150793
PCT Pub. Date: Aug. 23, 2018

(65) Prior Publication Data
US 2019/0363646 A1     Nov. 28, 2019

(30) Foreign Application Priority Data
Feb. 16, 2017 (JP) .................................. 2017-026756

(51) Int. Cl.
*H02P 6/00* (2016.01)
*H02M 7/5387* (2007.01)
(Continued)

(52) U.S. Cl.
CPC ........ *H02M 7/53871* (2013.01); *H02P 27/08* (2013.01); *B60K 6/22* (2013.01);
(Continued)

(58) Field of Classification Search
CPC ........................... H02M 7/53871; H02P 27/08
(Continued)

(56) References Cited

U.S. PATENT DOCUMENTS 6,023,417 A * 2/2000 Hava ................. H02M 7/53875
318/811
2012/0140532 A1* 6/2012 Tallam .............. H02M 7/53875
363/37

(Continued)

FOREIGN PATENT DOCUMENTS

JP          62-016076 A     1/1987
JP         2015-019458 A    1/2015

OTHER PUBLICATIONS

International Search Report dated Mar. 20, 2018 for the PCT International Application No. PCT/JP2018/001329.

*Primary Examiner* — Erick D Glass
(74) *Attorney, Agent, or Firm* — Volpe Koenig

(57) ABSTRACT

An object of the present invention is to reduce output voltage errors of an inverter circuit and stably control a motor until the motor reaches high speed rotation. An inverter device includes a PWM controller that generates a PWM pulse for converting DC voltage to AC voltage in accordance with an output request of a motor, and an inverter circuit that converts the DC voltage to the AC voltage with the PWM pulse generated by the PWM controller and drives a motor. The PWM controller changes the pulse width of the PWM pulse at predetermined timing on the upper side of the trapezoidal wave when the trapezoidal wave modulation using the trapezoidal wave is performed in the overmodulation region.

6 Claims, 7 Drawing Sheets

(51) Int. Cl.
 *H02P 27/08* (2006.01)
 *B60L 50/60* (2019.01)
 *B60K 6/22* (2007.10)
 *B62D 5/04* (2006.01)

(52) U.S. Cl.
 CPC .......... *B60L 50/60* (2019.02); *B60L 2210/14* (2013.01); *B60Y 2200/91* (2013.01); *B60Y 2200/92* (2013.01); *B60Y 2400/61* (2013.01); *B62D 5/04* (2013.01)

(58) Field of Classification Search
 USPC .................................................. 318/400.29
 See application file for complete search history.

(56) References Cited

U.S. PATENT DOCUMENTS

2015/0102759 A1* 4/2015 Shimomugi ........ H02M 3/1584
 318/504
2016/0211790 A1 7/2016 Ajima et al.

* cited by examiner (A) ZERO CROSS TIMING 1

(B) ZERO CROSS TIMING 2

INVERTER DEVICE AND ELECTRIC VEHICLE

TECHNICAL FIELD

The present invention relates to an inverter device and an electric vehicle.

BACKGROUND ART

Inverter driving devices that perform pulse-width modulation (PWM) control for driving motors often adopt an asynchronous PWM method that controls PWM by making the carrier frequency be constant with respect to variable output frequency of an inverter. Accordingly, when the inverter output frequency becomes high, the number of PWM pulses reduces and output errors of the inverter increase. Further, the output voltage error increases in an overmodulation mode in which the inverter output voltage command exceeds the maximum output level (sine wave) of the inverter.

PTL 1 discloses a technique of generating PWM pulses in an angular section where the output voltage is linearly approximated about the zero cross point to minimize output voltage errors.

CITATION LIST

Patent Literature

PTL 1: JP 2015-19458 A

SUMMARY OF INVENTION

Technical Problem

In PTL 1, the PWM pulse is generated in the angular section where the output voltage from the inverter device is linearly approximated about the zero cross point by changing either the time interval between the centers of PWM ON pulses or the time interval between the centers of PWM OFF pulses in accordance with the output request of the motor. This prevents the phenomenon of occurrence of the output voltage error of the inverter. In PTL 1, however, the PWM pulses near the peak center of the inverter output voltage (base wave) are not considered. This causes the voltage error to occur before and after the overmodulation region starts after the sine wave modulation.

Solution to Problem

An inverter device according to the present invention includes a PWM pulse generation unit that generates a PWM pulse for converting direct current (DC) voltage to alternating current (AC) voltage in accordance with an output request of a motor, and an inverter circuit that converts the DC voltage into the AC voltage with the PWM pulse generated by the PWM pulse generation unit to drive the motor, in which the PWM pulse generation unit changes a pulse width of the PWM pulse at predetermined timing on an upper side of a trapezoidal wave when trapezoidal wave modulation using the trapezoidal wave is performed in an overmodulation region.

An electric vehicle according to the present invention includes a PWM pulse generation unit that generates a PWM pulse for converting DC voltage to AC voltage in accordance with a output request of a motor, and an inverter circuit that converts the DC voltage into the AC voltage by the PWM pulse generated by the PWM pulse generation unit, and a DC-to-DC converter that boosts the DC voltage, in which the PWM pulse generation unit changes a pulse width of the PWM pulse at predetermined timing on an upper side of a trapezoidal wave in accordance with an output voltage of the DC-to-DC converter, when trapezoidal wave modulation using the trapezoidal wave is performed in an overmodulation region.

Advantageous Effects of Invention

According to the embodiment of the present invention, the output voltage errors of the inverter circuit are reduced, and the motor is stably controlled until the motor rotates at high speed.

DESCRIPTION OF EMBODIMENTS

The present invention provides an inverter device that drives a semiconductor switch element to provide a high output power by PWM control in which the inverter device changes a pulse width of a PWM pulse at predetermined timing on an upper side of a trapezoidal wave in accordance with a phase of the trapezoidal wave, when trapezoidal wave modulation using a trapezoidal wave is performed in an overmodulation region having a modulation rate equal to or greater than a predetermined value. In the following, an embodiment of the present invention will be described by referring to the accompanying drawings.

Figure 1:
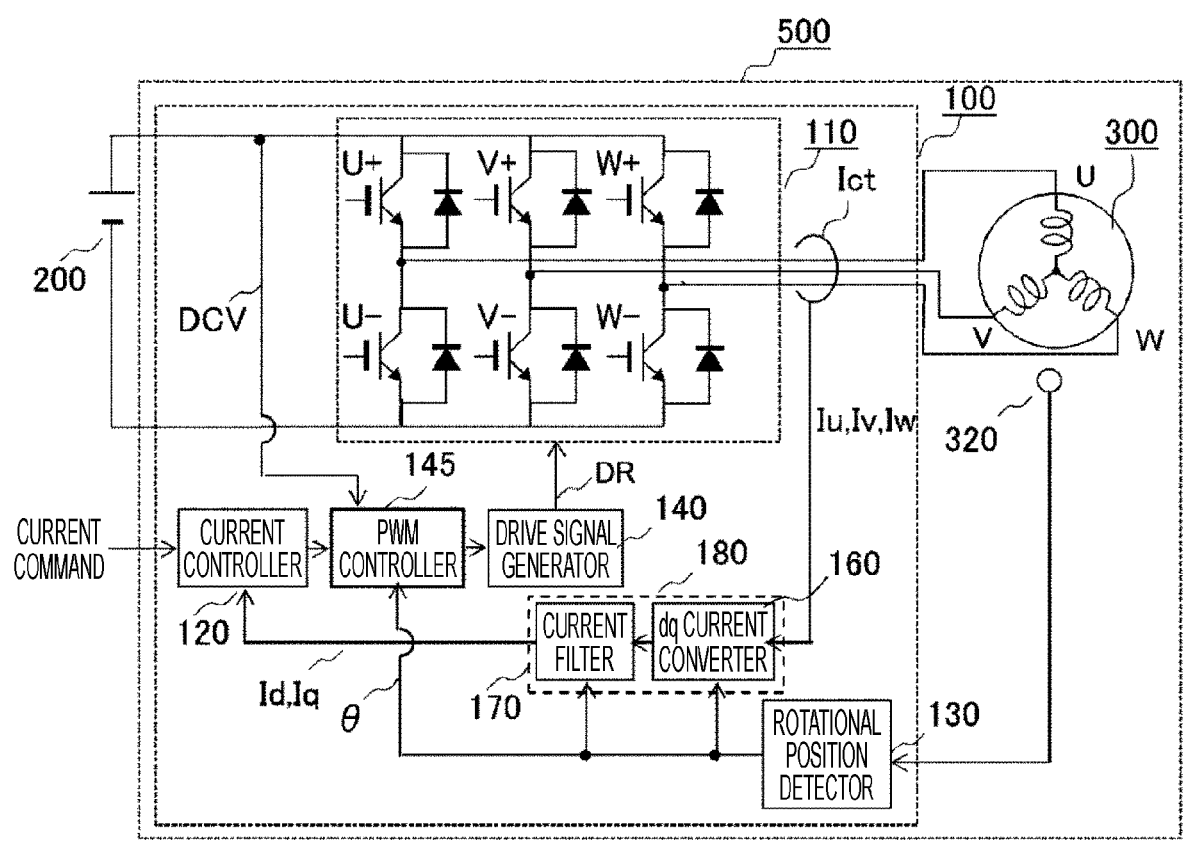
FIG. 1 is a block diagram illustrating a configuration of an inverter device of the present invention.

FIG. 1 is a block diagram illustrating a configuration of a motor device 500 including an inverter device 100 according to the present invention. The motor device 500 includes a motor 300 and the inverter device 100. The motor device 500 can be used to drive the motor 300 highly efficiently by detecting a mounting position error of a rotational position sensor of the motor 300 and correcting the mounting position error when the motor is driven.

The inverter device 100 includes a current detector 180, a current controller 120, a PWM controller 145, a drive signal generator 140, an inverter circuit 110, and a rotational position detector 130. A battery 200 is a DC voltage source of the inverter device 100. The DC voltage DCV of the battery 200 is converted into a three-phase alternating current of variable voltage and variable frequency by the inverter circuit 110 of the inverter device 100 and applied to the motor 300.

The motor 300 is a synchronous motor which is rotationally driven upon supply of the three-phase alternating current. The motor 300 includes a rotational position sensor 320 for controlling the phase of a three-phase AC of the applied voltage corresponding to the phase of an induced voltage of the motor 300, and a rotational position detector 130 calculates a detection position θs from an input signal of the rotational position sensor 320. Here, the rotational position sensor is more preferably a resolver constituted by an iron core and winding, but a sensor using a GMR sensor or a Hall element can be used.

The inverter device 100 has a current control function for controlling the output of the motor 300. The current detector 180 detects the three-phase motor current with a current sensor Ict, and includes a dq current converter 160 that outputs dq current detection values (Id', Iq') by performing dq conversion with three-phase current detection values (Iu, Iv, Iw) and rotational position θ, and a current filter 170 that smooths the dq current detection values (Id', Iq') and outputs the current detection values (Id, Iq). The current controller 120 outputs a voltage command (Vd*, Vq*) so that the current detection values (Id, Iq) and the input current command values (Id*, Iq*) match.

The PWM controller 145 performs two-phase to three-phase conversion of the voltage command (Vd*, Vq*) in accordance with the rotation angle θ, and executes pulse-width modulation (PWM) using a modulated wave corresponding to the three-phase voltage command (Vu*, Vv*, Vw*), on which 3rd harmonic is superimposed, to generate PWM pulses. In generating the PWM pulse, as will be described later, the modulated wave is linearly approximated near the zero cross, while a voltage adjusted pulse is generated, when trapezoidal wave modulation, which is PWM, is performed using a trapezoidal modulated wave, for changing the pulse width of the PWM pulse on the upper side portion of the trapezoidal wave. The PWM pulse generated by the PWM controller 145 is converted into a drive signal DR by the drive signal generator 140, and is output to the inverter circuit 110. The semiconductor switch element of the inverter circuit 110 is controlled to be turned on/off by a drive signal DR, and the output voltage of the inverter circuit 110 is adjusted.

To control the rotation speed of the motor 300, the motor device 500 calculates a rotation speed ωr of the motor according to a change with time of the rotational position θ, and generates a voltage command or a current command coinciding with a speed command from an upper controller. Further, to control the motor output torque, the current command (Id*, Iq*) is generated using a relation equation or a map of the motor current (Id, Iq) and the motor torque.

Figure 2:
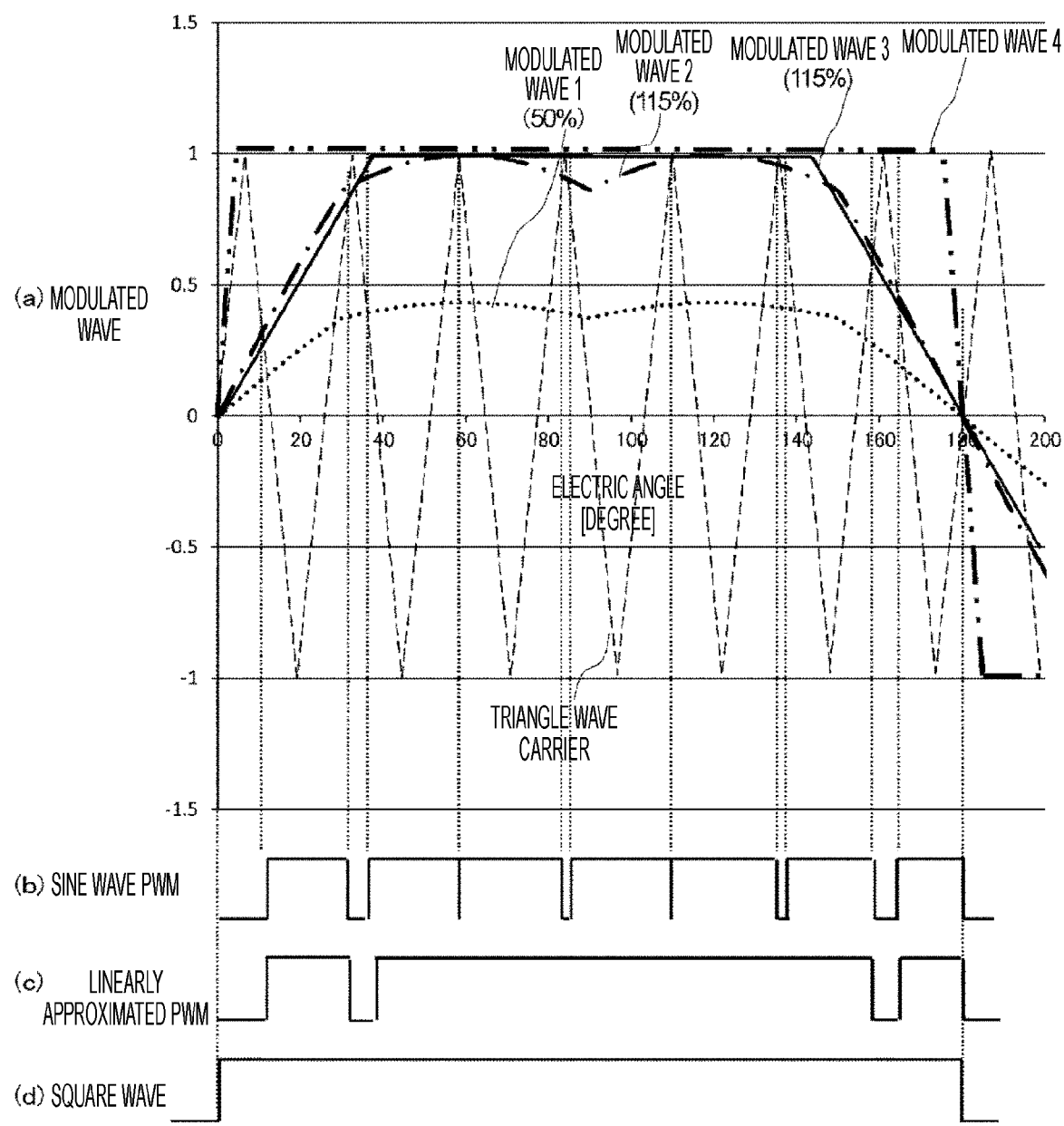
FIG. 2 is a waveform diagram illustrating modulated waves according to an embodiment.

Next, a waveform diagram illustrating modulated waves in an embodiment is described by referring to FIG. 2. FIG. 2(*a*) illustrates modulated signal waveforms and a carrier signal waveform including a modulated signal (modulated wave 1) having a relatively low modulation rate, a maximum modulated wave (modulated wave 2) capable of sine wave modulation, a modulated wave (modulated wave 3) having a trapezoidal shape obtained by linearly approximating the sine wave modulation, a modulated wave (modulated wave 4) in a square wave state providing a maximum inverter output, and a carrier signal compared to the modulated wave signal in its magnitude to generate a PWM pulse. FIG. 2(*b*) is a PWM pulse signal of the modulated wave 2, and FIG. 2(*c*) is a PWM pulse signal of the modulated wave 3. In FIG. 2(*c*), the PWM pulse of nearly 100% duty ratio is continuously in On state in the electric angle section of 30 to 150 degrees. FIG. 2(*d*) illustrates the PWM pulse signal of the modulated wave 4, and the PWM pulse signal is in the on state through the entire electric angle range of 0 to 180 degrees.

Each of the modulated waves is equivalent to one-phase modulated wave H(θ) of the three phase voltage command (Vuc, Vvc, Vwc). A U-phase modulated wave Hu (θ) nearly equals to Vuc/(DCV/2), if dead time is ignored. Assume that the effective value of the sine wave is 1 at which the modulation rate=1 when the inverter output is not saturated, the base wave component contained in the modulated wave H(θ) on which 3rd harmonic wave is superimposed is multiplied by 1.15 (115%) (modulated wave 2). In other words, the inverter output is not saturated until the modulation rate is 1.15 in the voltage command.

As illustrated in FIG. 2, the modulated wave H(θ) on which the 3rd harmonic is superimposed can be linearly approximated near zero cross. As the modulation rate increases, the modulated wave H(θ) approaches a trapezoidal wave like the modulated wave with 3 from a shape like the modulated wave 2. Therefore, in the region where the modulation rate is equal to or larger than a predetermined value, e.g., 1.15 or more, it is possible to calculate the PWM pulse using a trapezoidal wave such as the modulated wave 3. This simplifies the PWM modulation process using a microcomputer or the like, while controlling the voltage error of the PWM pulse caused by the fact that the modulated wave H(θ) and the carrier signal are asynchronous. If the modulated wave 2 is used, it is possible to linearly approximate the angular section of ±30 degrees of the electric angle about the zero cross of the modulated wave. However, the angular section of ±35 degrees of the electric angle is preferable when considering the voltage error near saturation.

In the PWM pulse calculation using the trapezoidal wave modulation, slope A of the modulated wave in the section where the linear approximation can be performed near the zero cross is proportional to the modulation rate according to the voltage command value, and the modulated wave is proportional to the angular position θ. For example, if the angle near the zero cross is θ' and the angle θ' is −30≤θ'≤30, the modulated wave H(θ') near the zero cross can be expressed by equation (1).

$$H(\theta')=A\cdot\theta' \quad (1)$$

In other words, the modulated wave H(θ) near the zero cross can be expressed using the slope A of the modulated wave instead of the modulation rate, so that the inverter output pulse or the PWM pulse near the zero cross can be determined from the slope A of the modulated wave.

Note that inverter output pulse may be determined to be 100%, if 0<θ<180, and 0%, if 180<θ<360, on the condition that |H(θ)|<|A·θ|

Figure 3:
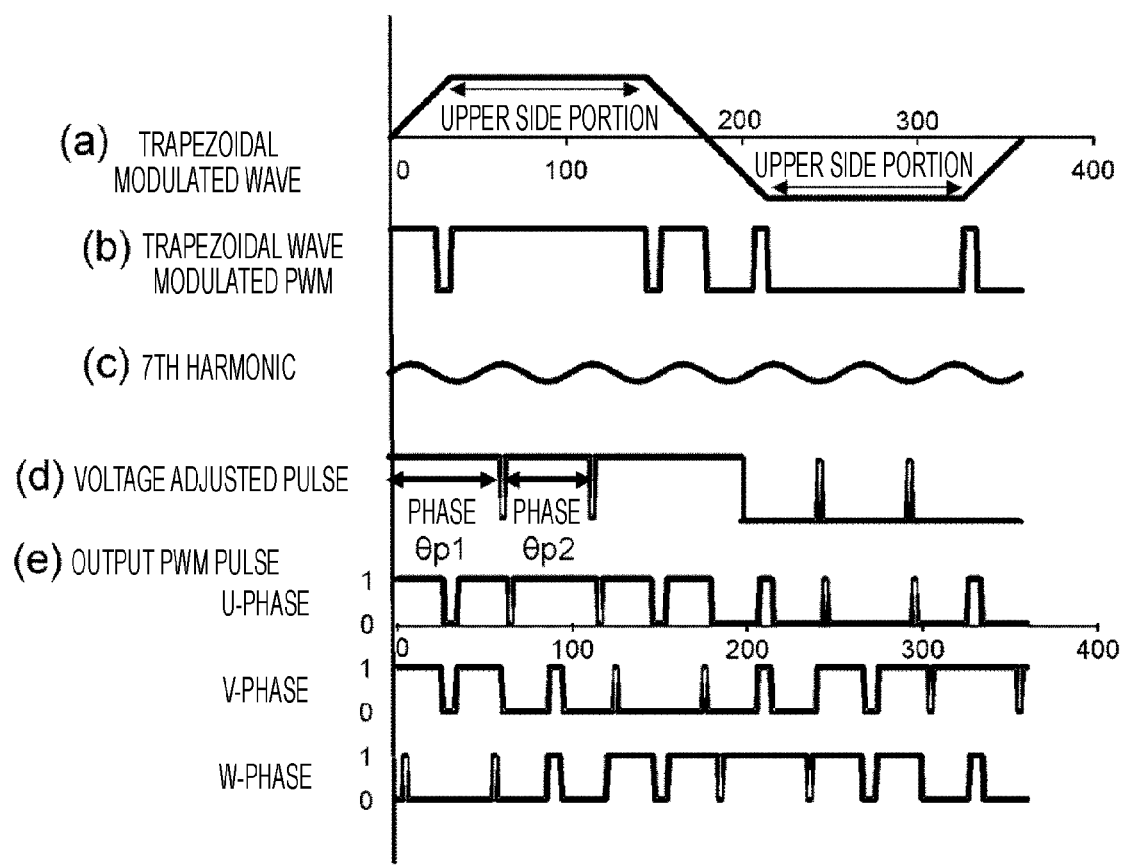
FIG. 3 is a waveform diagram illustrating pulse generation according to the embodiment.

Next, a waveform diagram illustrating pulse generation in one embodiment is described by referring FIG. 3. FIG. 3(*a*) illustrates a trapezoidal wave-like modulated wave (U-phase component), that is, the modulated wave 3 of FIG. 2(*a*). FIG. 3(*b*) illustrates a PWM pulse (U-phase component) generated by trapezoidal wave modulation using the modulated wave of FIG. 3(*a*). FIG. 3(*c*) illustrates the 7th harmonic (U-phase component) in the modulated wave of FIG. 3(*a*). FIG. 3(*d*) illustrates a voltage adjusted pulse (U-phase component) superimposed on the upper side portion of the trapezoid in the modulated wave of FIG. 3(*a*). FIG. 3(*e*) illustrates three phases of the PWM pulse of the inverter output obtained by superimposing the voltage adjusted pulse of FIG. 3(*d*) on the PWM pulse of FIG. 3(*b*).

In the trapezoidal modulated wave illustrated in FIG. 3(a), the angular section of approximately 30 to 150 degrees and the angular section of approximately 210 to 330 degrees correspond to the upper side portion of the trapezoidal wave. On the upper side portion, the modulated wave is at the highest or lowest level and does not change, causing no change in the PWM pulse as illustrated in FIG. 3(b). In other words, only ON pulse (or OFF pulse) is generated and OFF pulse (or ON pulse) is not generated as the PWM pulse on the upper side portions of the trapezoidal wave. As the period during which the PWM pulse does not change becomes longer, the error of the inverter output with respect to the voltage command increases. In the present embodiment, therefore, when the trapezoidal wave modulation is performed in the PWM controller 145, the voltage adjusted pulse is generated, as illustrated in FIG. 3(d), at predetermined timing on the upper side portions of the trapezoidal wave and output by being superimposed on the PWM pulse. This forcibly changes the pulse width of the PWM pulse and reduces the error of the inverter output.

The voltage adjusted pulse on the upper side portion of the trapezoidal modulated wave is generated at timing different from the generation timing of the PWM pulse. Preferably, the voltage adjusted pulse is generated at timing corresponding to the 7th harmonic of FIG. 3(c), specifically the timing of phase θp1 and the phase θp2, which are the reverse timing of the 7th harmonic, as illustrated in FIG. 3(d). By superimposing this voltage adjusted pulse on the original PWM pulse generated by trapezoidal wave modulation and outputting the generated PWM pulse from the PWM controller 145, the PWM pulse of inverter output as illustrated in FIG. 3(e) can be generated. This allows the current control to be stably continued by asynchronous PWM even in overmodulation region where the influence of voltage error and phase error is large.

Although FIG. 3(c) illustrates only the phases θp1 and θp2 of the voltage adjusted pulse on the upper side portion corresponding to the angular section of 30 to 150 degrees, the same can apply to the phase of the voltage adjusted pulse corresponding to the angular section of 210 to 330 degrees of the upper portion. In addition, the harmonics of other orders, instead of the 7th harmonic, may be used to generate the voltage adjusted pulse. In that case, the voltage adjusted pulse is generated at timing different from the phases θp1 and θp2 on the upper side portion of the trapezoidal wave.

Preferably, in the conventional PWM control, the PWM pulse is generated near the center between two peaks of the modulated wave 2, when the modulated wave 2 as illustrated in FIG. 2(a) is used. However, the PWM pulse is generated using a carrier signal having a carrier frequency asynchronous to the frequency of the AC voltage output from the inverter circuit 110 in the asynchronous PWM, so that the relationship between the phase of the modulated wave and the phase of the carrier signal is not constant. This may change the phase of the PWM pulse or cause the PWM pulse to disappear near the center of the modulated wave depending on the timing. For example, when the frequency (carrier frequency) of the carrier signal is 10 kHz and the frequency of the modulated wave is 800 Hz, the electric angle per cycle of the carrier signal is about 28 degrees, and depending on the timing, the PWM Pulse sometimes disappear near the center of the modulated wave. Therefore, in the asynchronous PWM using the modulated wave 2, the phenomenon of unstable motor current occurs.

Therefore, in the embodiment of the present invention, the PWM pulse may be generated at desired timing by determining the phase of the PWM pulse in accordance with the phase of the modulated wave even in the asynchronous PWM. For example, the PWM pulse is generated at timing in the opposite phase of the 7th harmonic of the modulated wave, and output by superimposing the voltage adjusted pulse on the generated PWM pulse. This allows the inverter circuit 110 to be controlled stably and the 7th harmonic to be reduced.

To output the PWM pulse at the desired timing as described above, a so-called pulse shift method is known. In this method, the position of the PWM pulse is shifted from the position corresponding to the carrier signal. In this method, the PWM controller 145 shifts the turn-on/turn-off timing of the PWM pulse from the timing at which the modulated wave crosses the carrier signal to generate the PWM pulse at the timing according to the desired phase of the modulated wave. At this time, by adjusting the shift amount according to the phase of the modulated wave, it is possible to generate the PWM pulse at any timing different from the timing that is based on the carrier signal.

In the example of the above description, the case of asynchronous PWM is taken as an example, but PWM control using trapezoidal modulated waves can be performed by synchronous PWM in the same manner. Unlike the asynchronous PWM, the relationship between the phase of the modulated wave and the phase of the carrier signal is kept constant in the synchronous PWM, and the period of the modulated wave is set to, for example, an integral multiple of the period of the carrier signal. Except for this point, the same can apply to both the synchronous PWM and the asynchronous PWM.

As described above, the PWM controller 145 generates the voltage adjusted pulse in the embodiment of the present invention, regardless of whether the PWM control method is asynchronous PWM or synchronous PWM, so that the pulse width of the PWM pulse changes on the upper side portion of the trapezoidal modulated wave. As a result, the time interval between the centers of the ON pulses or the time interval between the centers of the OFF pulses in the plurality of PWM pulses is controlled to be different from the time interval corresponding to the cycle of the carrier signal. In other words, the PWM controller 145 according to the embodiment of the present invention generates the voltage adjusted pulse at the timing different from the timing of generating the PWM pulse on the upper side section of the trapezoidal modulated wave, thus changing the pulse width of the PWM pulse at the predetermined timing on the upper side of the trapezoidal modulated wave.

Note that, in FIG. 3, the inverter output frequency is relatively large with respect to the carrier frequency. A lower inverter output frequency can be handled similarly to the case of FIG. 3, except that the number of PWM pulses near the zero cross of the trapezoidal modulated wave and the number of pulses superimposed on the upper side portions increase.

Figure 4:
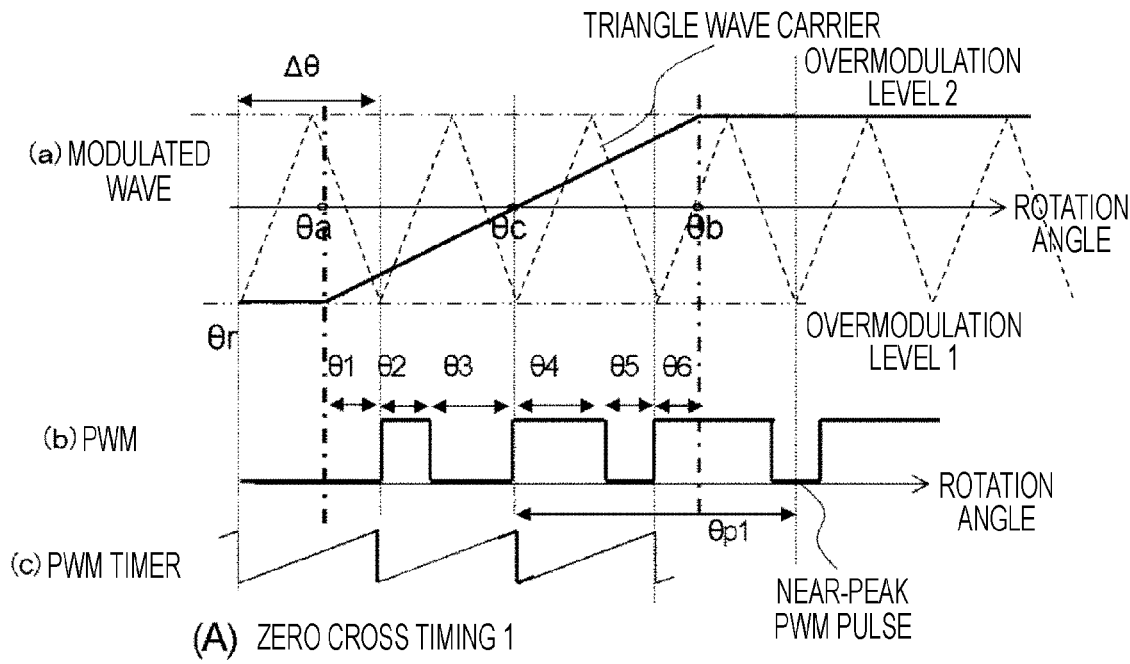
FIG. 4 is a waveform diagram illustrating pulse generation according to the embodiment.
Figure 4:
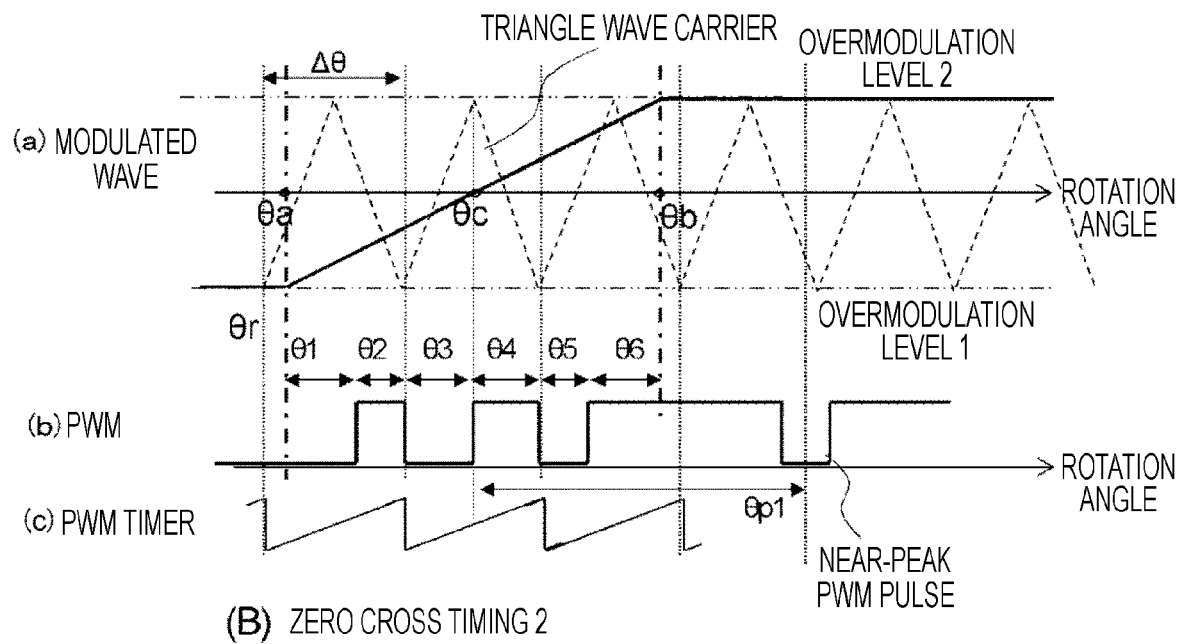

Next, a waveform diagram illustrating pulse generation in the embodiment is described by referring to FIG. 4. FIG. 4(A) illustrates a case where the PWM pulse is turned on in the first half of the triangle wave carrier, that is, in the rising edge of the triangle wave carrier signal, according to the phase relationship between the modulated wave and the triangle wave carrier. A signal waveform of FIG. 4(A) is referred to as a signal waveform of zero cross timing 1. FIG. 4(B) illustrates a case where the PWM pulse is turned on in the second half of the triangle wave carrier, that is, in the falling edge of the triangle wave carrier signal according to the phase relationship between the modulated wave and the triangle wave carrier. The signal waveform of FIG. 4(B) is referred to as a signal waveform of zero cross timing 2.

Both FIGS. 4(A) and (B) illustrate examples when the motor rotates at a constant speed, the angular change width Δθ of the rotation of the motor during a certain PWM carrier period is substantially constant, and this angular change width Δθ is equivalent to the carrier period. Further, these examples illustrate the case where two or three PWM pulses are generated in the section where the modulated wave is linearly approximated near the zero cross.

FIGS. 4(A) and (B) illustrate (a) a modulated wave and a triangle wave carrier signal, (b) PWM pulses to be output in one PWM period, and (c) a value of a PWM timer, which is a sawtooth-shaped PWM timer in the present embodiment, when the PWM pulse is generated using a microcomputer.

As described above, the signal waveform of the zero cross timing 1 in FIG. 4(A) illustrates the case where the PWM pulse is turned on in the rising edge of the triangle wave carrier signal, and the modulated wave reaches an overmodulation level 1 at position θa apart from angular position θr by Δθ/2 or more. In the signal waveform of the zero cross timing 1, the PWM pulse is set High only in section θ2 at timing after the angular position θr+Δθ. Thereafter, a Low pulse is output until angle θc at which the modulated wave H(θ) becomes zero. Then, the PWM pulse is set High at angle θc, and the Low PWM pulse is output only in section θ5 after angle θc. Thereafter, the modulated wave reaches the overmodulation level 2 at angle θb.

Figure 7:
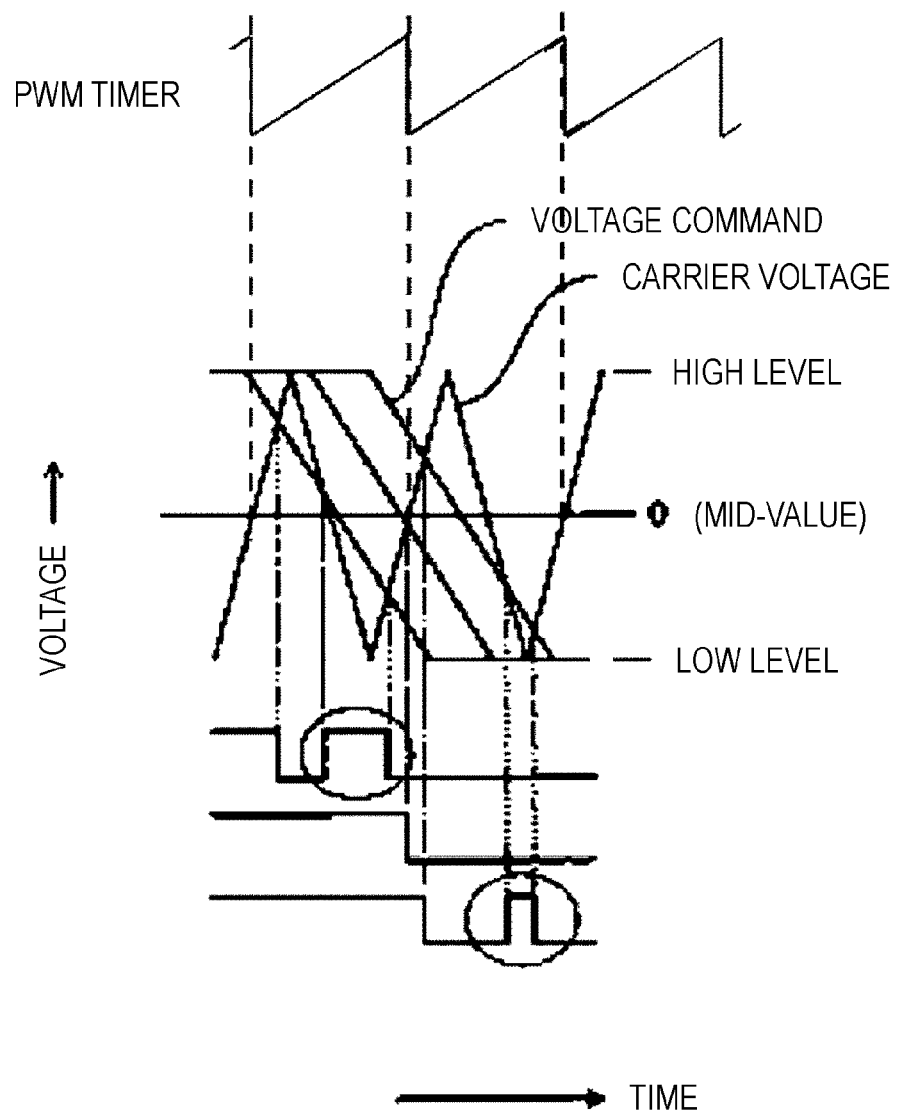
FIG. 7 is a conventional waveform diagram illustrating near zero cross.

In the conventional overmodulation mode, the PWM pulse is output in a manner that a middle level value of 50% duty is provided in a transition section between a high level value at which the modulated wave is at 100% duty and a low level value at which the modulated wave is at 0% duty. This prevents the phenomenon of disappearing of the pulse components due to discontinuous crossings of the modulated wave (refer to FIG. 7) and the PWM carrier caused by steep slope of the modulated wave. In this method, however, the 50% duty is set near the zero cross of the inverter output voltage where the average voltage is 0 V, thus causing the decrease of the output of the inverter.

The embodiment of the present invention, therefore, prevents the decrease of output in the electric angle range of, for example, ±30 by equalizing the output voltage in the range of ±30 degrees of the electric angle on the negative side in the range of −30 degrees and the positive side in the range of +30 degrees before and after the zero cross of the modulated wave.

In FIGS. 4(A) and (B), if θ2=θ5, the magnitude of voltage on the negative side and the positive side can be balanced about the zero cross of the modulated wave. Further, the pulse edge can be generated by adjusting θc−θa=θb−θc near the zero cross of the modulated wave, whereby the phase error of the inverter output can be reduced. Further, the PWM pulse accurately corresponding to the magnitude of the modulated wave can be generated, whereby the decrease of the inverter output can be prevented.

Here, the PWM pulse width to be output by the PWM controller 145 is described for the section between the rotation angle θc at the zero cross point of the modulated wave and the rotation angle θc at which the modulated wave reaches the overmodulation level 2. Assuming that the modulated wave is normalized to −1 (overmodulation level 1) to +1 (overmodulation level 2), an area of the modulated wave between the normalized value=0 of the rotation angle θc and the normalized value=1 of the rotation angle θb is ½. On the other hand, assuming that 100% On-Duty pulse capable of being output in the section (between the rotation angles θa and θb) of the normalized modulated wave −1 to +1, 50 to 100% (Δ50%) On-Duty pulse corresponds to the section (rotation angle θc to θb) of the normalized modulated wave 0 to 1. In other words, the section average of On-Duty for the rotation angles θc to θb in FIG. 4 (A) is 75%, while θ4, θ5, and θ6 are determined such that On-Duty=75% corresponding to 1.5 times the PWM pulse in the section of the rotation angles θc to θb. Preferably, θ5=25% is set as Off-Duty, because θ4 and θ6 are On-Duty. Similarly, for the section of the rotation angles θa to θc, θ1 and θ3 need to be set as Off-Duty and θ2 needs to be set On-Duty=25%.

Thus, the PWM controller 145 generates the PWM pulses so that integrated values for the ON pulse area and the OFF pulse area of the PWM pulse are equal in the angular section θa to θb which is linearly approximated about the zero cross point θc of the output voltage.

As described above, the signal waveform of the zero cross timing 2 in FIG. 4(B) illustrates the case where the PWM pulse is turned on at the falling edge of the triangle wave carrier signal, and the modulated wave reaches the overmodulation level 1 at the angular position θa within Δθ/2 from the timing of the angular position θr. In the signal waveform of the zero cross timing 2, the overmodulation level 1 is reached at the angular position θa. This is what differs from FIG. 4(A). Other portions are similar to FIG. 4(A) except that the PWM pulse becomes High in the second half of the triangle wave carrier, that is, in the falling slope side from the phase relation between the modulated wave and the triangle wave carrier.

In the embodiment of the present invention, the PWM controller 145 generates the PWM pulse such that the pulse width changes near the zero cross of the modulated wave within the period of the asynchronous PWM, and the time interval between centers of the PWM ON pulses or the time interval between centers of the PWM OFF pulses is controlled to be different. In other words, the PWM controller 145 generates the PWM pulse such that the time interval between centers of a plurality of PWM ON pulses differs from the time interval between centers of a plurality of PWM OFF pulses depending on the operation state of the inverter circuit 110, that is, the output request of the motor, at timing different from the timing based on the carrier signal in the angular section where the output voltage is linearly approximated about the zero cross point. As a result, the present embodiment eliminates the imbalance between the positive side voltage integration (positive side voltage) and the negative side voltage integration (negative side voltage) that changes in ½ cycle of the AC output to prevent the phenomenon of occurrence of the output voltage error of the inverter circuit 110, while generating the voltage adjusted pulse stably on the upper side portion of the trapezoidal modulated wave which determines the output voltage of the inverter circuit 110. This reduces the voltage error before and after entering the overmodulation region from the sine wave modulation to stably control the motor current.

FIG. 4 illustrates the PWM pulses of one phase, and the other two phases are at the overmodulation level 1 or overmodulation level 2 during the overmodulation mode.

In FIG. 4, the rising edge and the falling edge of the PWM pulse are synchronized with the timing of the PWM carrier cycle. However, the rising edge and the falling edge of the PWM pulse are not necessarily coincided with the timing of the PWM carrier cycle, and it is desirable to make the waveform of the output voltage symmetrical with respect to the angle θc. Although the case where the motor 300 is rotating at a constant speed has been described, the similar logic may be used to generate the PWM pulse by calculating Δθ by considering the acceleration or deceleration when the motor 300 is accelerating or decelerating.

The inverter device 100 described above includes the PWM controller 145 that generates the PWM pulse for converting DC voltage to AC voltage in accordance with the output request of the motor, that is, the operation state of the inverter, and the inverter circuit 110 that converts DC voltage to AC voltage with the PWM pulse generated by the PWM controller 145 to drive the motor 300. The PWM controller 145 outputs the PWM pulse generated by the sine wave modulation and the trapezoidal wave modulation according to the modulation rate, so that the motor 300 can be driven at a predetermined torque and a predetermined rotation speed in response to the output request of the motor. Further, when performing the trapezoidal wave modulation using the trapezoidal wave in the overmodulation region where the modulation rate is a predetermined modulation rate, the pulse width of the PWM pulse can be changed at predetermined timing on the upper side of the trapezoidal wave.

The pulse width of the PWM pulse can be changed in the embodiment described above by generating the voltage adjusted pulse at the predetermined timing on the upper side portion of the trapezoidal modulated wave, in accordance with the phase difference amount between the trapezoidal modulated wave and the carrier signal, by shifting the timer comparison value depending on the operation state of the inverter. The pulse width of the PWM pulse may be changed by other methods.

The embodiment of the present invention adjusts the PWM pulse timing on the upper side portion of the trapezoidal modulated wave and near the zero cross by performing pulse-shifting at arbitrary timing within the PWM carrier cycle, thus providing the inverter output including reduced influence of errors of the output voltage (and phases) of the inverter even in the asynchronous PWM control. Further, the effect of better reducing the increase of load of the microcomputer than the synchronous PWM control is obtained.

The embodiment of the present invention provides the effect of generating the PWM pulse having the phase for decreasing lower-order harmonics included in the output voltage of the inverter.

Figure 5:
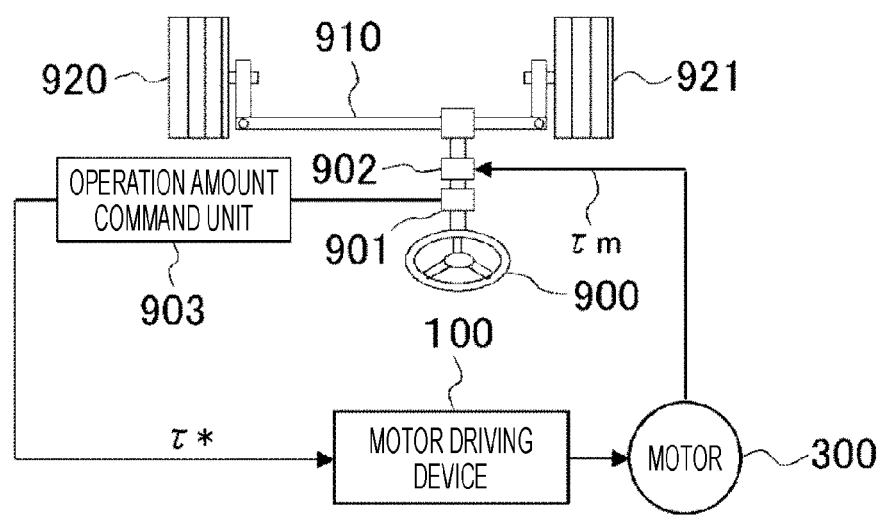
FIG. 5 illustrates the structure of an electric power steering apparatus to which the inverter device according to the present invention is applied.

Next, the structure of an electric power steering apparatus to which the motor driving device of the embodiment of the present invention is applied is described by referring to FIG. 5.

FIG. 5 is a structural view of the electric power steering apparatus to which the motor driving device of the embodiment of the present invention is applied.

As illustrated in FIG. 5, an electric actuator of the electric power steering includes a torque transmission mechanism 902, a motor 300, and an inverter device 100. The electric power steering apparatus includes an electric actuator, a steering wheel 900, a steering detector 901, and an operation amount command unit 903. Operating force of a driver applied to the steering wheel 900 provides torque assistance using the electric actuator.

A torque command τ* of the electric actuator is generated by the operation amount command unit 903 as the steering assist torque command of the steering wheel 900. The steering force of the driver is reduced using the output of the electric actuator driven by the torque command τ*. The inverter device 100 receives the torque command τ* as an input command to control the motor current, and controls the motor current so as to follow the torque command value from the torque constant of the motor 300 and the torque command τ*.

A motor output τm output from the output shaft directly connected to the rotor of the motor 300 transmits the torque to a rack 910 of the steering apparatus via a torque transmission mechanism 902 using a reduction mechanism such as a worm gear, a wheel gear, a planetary gear, or a hydraulic mechanism. By the torque transmitted to the rack 910, the steering force (operating force) of the driver to operate the steering wheel 900 is reduced (assisted) by the electric power, and the steering angle of the wheels 920 and 921 is manipulated.

The assist amount is determined as follows. Specifically, the steering angle and the steering torque are detected by the steering detector 901 installed in the steering shaft, and the torque command τ* is calculated by the operation amount command unit 903 by considering the state quantity such as the vehicle speed and the road surface condition.

The inverter device 100 according to the embodiment of the present invention is advantageous in low vibration and low noise during high speed rotation by averaging the output voltage of the inverter.

Figure 6:
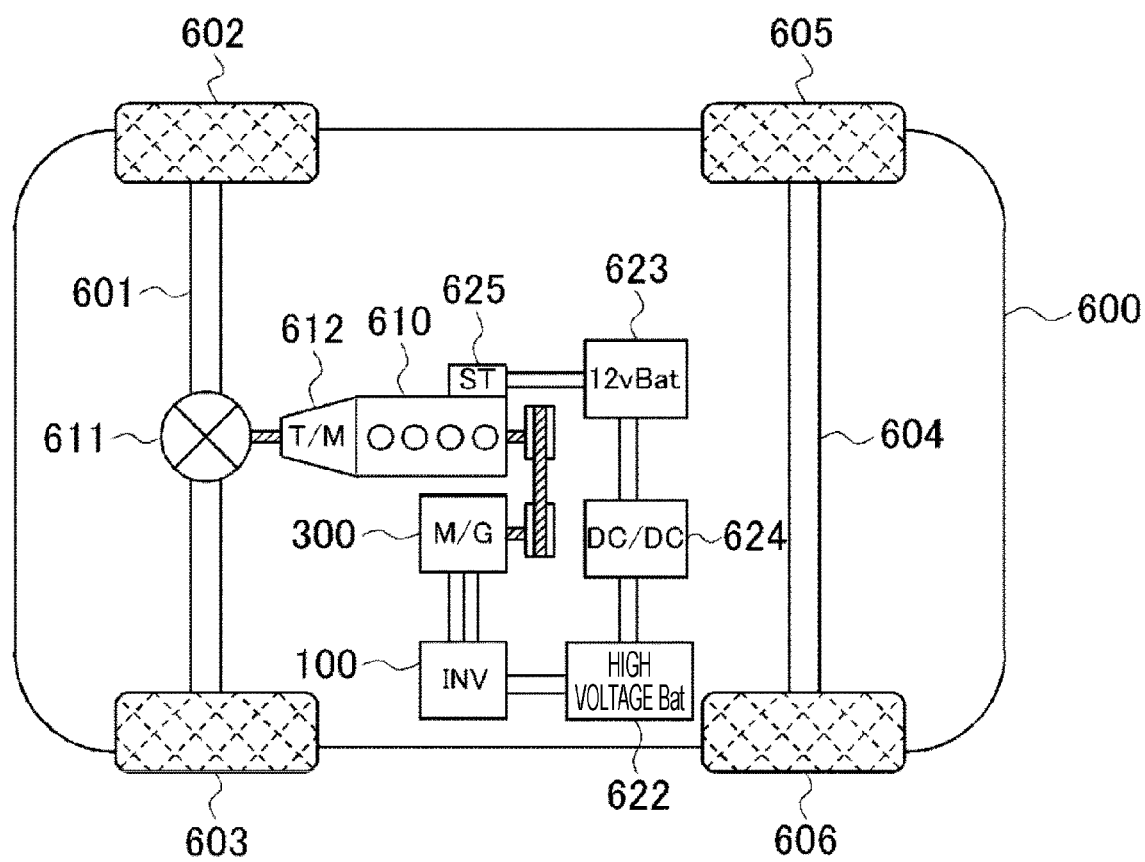
FIG. 6 illustrates the structure of an electric vehicle to which the inverter device according to the present invention is applied.

FIG. 6 illustrates an electric vehicle 600 to which the inverter device 100 according to the present invention is applied. The electric vehicle 600 includes a power train to which the motor 300 is used as a motor/generator.

A front wheel axle 601 is rotatably supported in the front portion of the electric vehicle 600, and front wheels 602 and 603 are provided at both ends of the front wheel axle 601. A rear wheel axle 604 is rotatably supported in the rear portion of the electric vehicle 600, and rear wheels 605 and 606 are provided at both ends of the rear wheel axle 604.

A differential gear 611 serving as a power distribution mechanism is provided in the center portion of the front wheel axle 601 to distribute rotational driving force transmitted from an engine 610 via transmission 612 to the right and left portions of the front wheel axle 601. The engine 610 and the motor 300 are mechanically connected via a belt bridged between pulleys provided on the crankshaft of the engine 610 and the rotation shaft of the motor 300.

Thus, the rotational driving force of the motor 300 can be transmitted to the engine 610, and the rotational driving force of the engine 610 can be transmitted to the motor 300, respectively. In the motor 300, the three-phase AC power controlled by the inverter device 100 is supplied to the stator coil of the stator, whereby the rotor rotates to generate the rotational driving force corresponding to the three-phase AC power.

In other words, the motor 300 operates as an electric motor under the control of the inverter device 100, and also operates as a generator that generates three-phase AC power by rotating the rotor upon receiving the rotational driving force of the engine 610.

The inverter device 100 is a power conversion device that converts DC power supplied from a high voltage battery 622, which is a high voltage (42 V or 300 V) power supply, into three phase AC power, and controls the three-phase AC current flowing through the stator coil of the motor 300 in accordance with the operation command value and the magnetic pole position of the rotor.

The three-phase AC power generated by the motor 300 is converted into DC power by the inverter device 100 and charges the high voltage battery 622. The high voltage battery 622 is electrically connected to a low voltage battery 623 via a DC-to-DC converter 624. The low voltage battery 623 constitutes a low voltage (14 v) power supply of the electric vehicle 600, and is used as a power supply for a starter 625 for initially starting (cold starting) the engine 610, a radio, light, and the like.

To stop the engine 610 when the electric vehicle 600 is stopped (idle stop mode), for example, to wait for a signal or to restart the engine 610 when the electric vehicle 600 is restarted, the inverter device 100 drives the motor 300 to restart the engine 610.

The engine 610 is not stopped and the driving is continued if the amount of charge of the high voltage battery 622 is insufficient or the engine 610 is not sufficiently warmed in the idle stop mode. During the idle stop mode, it is also necessary to securely provide a drive source for auxiliary components, such as a compressor of the air conditioner, that use the engine 610 as a driving source. In this case, the motor 300 is driven to drive auxiliary components.

In acceleration mode or high load operation mode, the motor 300 is also driven to assist driving of the engine 610. On the contrary, in the charging mode in which charging of the high voltage battery 622 is necessary, the engine 610 causes the motor 300 to generate power to charge the high voltage battery 622. In other words, the motor 300 is regeneratively operated in braking or decelerating the electric vehicle 600.

The electric vehicle 600 includes the inverter device 100 that generates the PWM pulse for converting DC voltage to AC voltage in accordance with the motor output request and converts the DC voltage to the AC voltage according to the generated PWM pulse to drive the motor, and the electric vehicle 600 also includes the DC-to-DC converter 624 to boost the DC voltage. The inverter device 100 generates the PWM pulse, through the processing by the PWM controller 145, by changing either the time interval between the centers of the PWM ON pulses or the time interval between the centers of the PWM OFF pulses in accordance with the output voltage of the DC-to-DC converter 624 in the angular section where the output voltage is linearly approximated about the zero cross point. When performing the trapezoidal wave modulation using a trapezoidal wave in the overmodulation region, the pulse width of the PWM pulse is also changed in accordance with the output voltage of the DC-to-DC converter 624 at predetermined timing on the upper side of the trapezoidal wave.

The electric vehicle using the inverter driving device of the present invention changes either the time interval between centers of the PWM ON pulses or the time interval between centers of the PWM OFF pulses in accordance with the output voltage of the DC-to-DC converter 624 that controls the DC voltage in the angular section (corresponding to θa to θb in FIG. 4) where the output voltage is linearly approximated about the zero cross point (corresponding to θc in FIG. 4). When performing the trapezoidal wave modulation using a trapezoidal wave in the overmodulation region, the pulse width of the PWM pulse is also changed in accordance with the output voltage of the DC-to-DC converter 624 at predetermined timing on the upper side of the trapezoidal wave. This ensures stable control of expanding the output range of the inverter device 100 by adjusting the output voltage of the DC-to-DC converter 624 of the electric vehicle 600.

According to the inverter device of the present invention described above, the following effects are obtained. (1) The inverter device 100 of the present invention includes the PWM pulse generation unit or the PWM controller 145 that generates the PWM pulse for converting DC voltage to AC voltage in accordance with the output request of the motor, and the inverter circuit 110 that converts the DC voltage to the AC voltage in accordance with the PWM pulse generated by the PWM controller 145 to drive the motor 300. The PWM controller 145 changes the pulse width of the PWM pulse at predetermined timing on the upper side of the trapezoidal wave when the trapezoidal wave modulation using the trapezoidal wave is performed in the overmodulation region. Thus, the voltage error between the sine wave modulation and the trapezoidal wave modulation can be adjusted, and the error of the output voltage and the phase caused by the operation state of the inverter device 100 can be reduced. This ensures the stable control of the motor until the motor reaches high speed rotation.

(2) In the inverter device 100 of the present invention, the PWM controller 145 generates the PWM pulse by asynchronous PWM using the carrier signal having the carrier frequency asynchronous to the frequency of the AC voltage. This ensures the stable control of the motor even for the asynchronous PWM that requires less processing load.

(3) In the inverter device 100 of the present invention, the PWM controller 145 generates the PWM pulse at the timing based on the carrier signal, and generates the voltage adjusted pulse for changing the pulse width of the PWM pulse at timing different from the timing of generating the PWM pulse. This allows changing of the pulse width of the PWM pulse at desired timing regardless of the carrier frequency.

(4) In the inverter device 100 of the present invention, the PWM controller 145 generates the voltage adjusted pulse at the timing corresponding to a predetermined order harmonic of the trapezoidal wave, such as the 7th harmonic. This achieves the stable motor control using the inverter output, in which the harmonics are reduced, regardless of the operating state of the inverter device 100.

(5) In the inverter device 100 of the present invention, the PWM controller 145 generates the PWM pulse at the timing different from the timing based on the carrier signal in the angular section where the linear approximation is performed about the zero cross point of the trapezoidal wave. This allows generation of the PWM pulse at optimal timing from the zero cross point to near the peak of the trapezoidal wave even during the high speed rotation of the motor, and decreases the voltage error and the phase error of the inverter output.

(6) The electric vehicle 600 of the present invention includes the PWM pulse generation unit or the PWM controller 145 that generates the PWM pulse for converting DC voltage to AC voltage in accordance with the output request of the motor, the inverter circuit 110 that converts the DC voltage to the AC voltage in accordance with the PWM pulse generated by the PWM controller 145 to drive the motor 300, and the electric vehicle 600 also includes the DC-to-DC converter 624 that boosts the DC voltage. When performing trapezoidal wave modulation using the trapezoidal wave in the overmodulation region, the PWM controller 145 changes the pulse width of the PWM pulse based on the output voltage of the DC-to-DC converter 624 at predetermined timing on the upper side of the trapezoidal wave. This adjusts the voltage error between the sine wave modulation and the trapezoidal wave modulation, and decreases the error in the output voltage or the phase caused by the operation state of the DC-to-DC converter 624. This ensures the stable control of the motor until the motor reaches high speed rotation, while stably controlling the output range of the inverter device 100 to be expanded by adjusting the output voltage of the DC-to-DC converter 624 of the electric vehicle 600.

Although the electric vehicle 600 of the embodiment is described as a hybrid car, the same effect can be obtained also in the case of a plug-in hybrid car, an electric car, or the like.

Further, in the above-described embodiment, the inverter device alone has been described, but the present invention can also be applied to a motor drive system in which the inverter device and the motor are integrated as long as it has the above-described function.

The present invention is not limited to the embodiments described above, and various changes may be provided without departing from the scope of the invention.

REFERENCE SIGNS LIST 100 inverter device
110 inverter circuit
120 current controller
130 rotational position detector
140 drive signal generator
145 PWM controller
160 dq current converter
170 current filter
180 current detector
200 battery
300 motor
320 rotational position sensor
500 motor device
600 electric vehicle

The invention claimed is:

1. An inverter device comprising:
a PWM pulse generation unit configured to generate a PWM pulse for converting direct current (DC) voltage to alternating current (AC) voltage in accordance with an output request of a motor; and
an inverter circuit configured to convert the DC voltage to the AC voltage with the PWM pulse generated by the PWM pulse generation unit and drive the motor, wherein
the PWM pulse generation unit changes a pulse width of the PWM pulse at predetermined timing on an upper side of the trapezoidal wave when trapezoidal wave modulation using a trapezoidal wave is performed in an overmodulation region.

2. The inverter device according to claim 1, wherein
the PWM pulse generation unit generates the PWM pulse by asynchronous PWM using a carrier signal having a carrier frequency asynchronous to a frequency of the AC voltage.

3. The inverter device according to claim 2, wherein
the PWM pulse generation unit
generates the PWM pulse at timing based on the carrier signal, and
generates a voltage adjusted pulse for changing a pulse width of the PWM pulse at timing different from the timing for generating the PWM pulse.

4. The inverter device according to claim 3, wherein
the PWM pulse generation unit generates the voltage adjusted pulse at timing in according with a harmonic of a predetermined order of the trapezoidal wave.

5. The inverter device according to claim 2, wherein
the PWM pulse generation unit generates the PWM pulse at timing different from the timing based on the carrier signal in an angular section where linear approximation is performed about zero cross point of the trapezoidal wave.

6. An electric vehicle comprising:
a PWM pulse generation unit configured to generate a PWM pulse for converting DC voltage to AC voltage in accordance with an output request of a motor;
an inverter circuit configured to convert the DC voltage to the AC voltage with the PWM pulse generated by the PWM pulse generation unit and drive the motor; and
a DC-to-DC converter configured to boost the DC voltage, wherein
the PWM pulse generation unit changes a pulse width of the PWM pulse at predetermined timing on an upper side of the trapezoidal wave in accordance with an output voltage of the DC-to-DC converter when trapezoidal wave modulation using the trapezoidal wave is performed in an overmodulation region.

* * * * *